US010735532B2

(12) United States Patent
Oberli et al.

(10) Patent No.: US 10,735,532 B2
(45) Date of Patent: *Aug. 4, 2020

(54) SYSTEM AND METHOD FOR DETECTING INTERACTION AND INFLUENCE IN NETWORKS

(71) Applicant: Axon Vibe AG, Lucerne (CH)

(72) Inventors: Roman Oberli, Sarnen (CH); Thomas Annicq, New York, NY (US)

(73) Assignee: AXON VIBE AG, Lucerne (CH)

( * ) Notice: Subject to any disclaimer, the term of this patent is extended or adjusted under 35 U.S.C. 154(b) by 549 days.

This patent is subject to a terminal disclaimer.

(21) Appl. No.: 15/298,353

(22) Filed: Oct. 20, 2016

(65) Prior Publication Data

US 2017/0111462 A1   Apr. 20, 2017

Related U.S. Application Data

(60) Provisional application No. 62/243,955, filed on Oct. 20, 2015.

(51) Int. Cl.
*H04L 29/08* (2006.01)
*G06F 16/28* (2019.01)
(Continued)

(52) U.S. Cl.
CPC .......... *H04L 67/22* (2013.01); *G06F 16/2379* (2019.01); *G06F 16/24578* (2019.01);
(Continued)

(58) Field of Classification Search
CPC ..... H04L 67/22; H04L 67/18; G06F 16/2379; G06F 16/288; G06F 16/9535; G06F 16/24578; H06L 67/22
See application file for complete search history.

(56) References Cited

U.S. PATENT DOCUMENTS

2008/0059207 A1*   3/2008   Belimpasakis ......... H04L 67/22
                                                                              709/203
2010/0169134 A1*   7/2010   Cheng ..................... G06Q 10/06
                                                                              705/7.42
(Continued)

FOREIGN PATENT DOCUMENTS

RU        2013141052 A     4/2015
WO    WO-2004051580 A1   6/2004
WO    WO-2015056269 A1   4/2015

OTHER PUBLICATIONS

International Search Report and Written Opinion issued by the U.S. Patent and Trademark Office as Searching Authority, issued in International Application No. PCT/US16/59328, dated Jan. 3, 2017 (8 pages).
(Continued)

*Primary Examiner* — Alford W Kindred
*Assistant Examiner* — Lin Lin M Htay
(74) *Attorney, Agent, or Firm* — Wilmer Cutler Pickering Hale and Dorr LLP

(57) ABSTRACT

Systems and methods for providing location-based recommendation to a user that leverages common characteristics between the user and other users in a network such that the common characteristics are derived based on monitoring and analyzing user information at different times and locations. A computing device receives information associated with each of a plurality of entities in a network, including a transaction and an activity, the transaction and the activity each being associated with a location and a time. The computing device receives updated information and creates a data structure relating the first entity and a subset of the plurality of entities based on the updated information. The computing device determines a recommendation related to the updated information, calculates a relevance value
(Continued)

between entities in the subset of entities, and transmits the recommendation to one of the entities.

18 Claims, 4 Drawing Sheets

(51) Int. Cl.
    *G06F 16/23*     (2019.01)
    *G06F 16/9535*   (2019.01)
    *G06F 16/2457*   (2019.01)

(52) U.S. Cl.
    CPC ........ *G06F 16/288* (2019.01); *G06F 16/9535* (2019.01); *H04L 67/18* (2013.01)

(56) References Cited

U.S. PATENT DOCUMENTS

| | | |
|---|---|---|
| 2011/0238514 A1 | 9/2011 | Ramalingam et al. |
| 2012/0095862 A1* | 4/2012 | Schiff .................... G06Q 30/06 705/26.7 |
| 2013/0024471 A1* | 1/2013 | Mitrovic ............. G06F 16/9535 707/769 |
| 2013/0073336 A1 | 3/2013 | Heath |
| 2013/0080523 A1 | 3/2013 | Rubinstein et al. |
| 2013/0346233 A1 | 12/2013 | Caralis et al. |
| 2014/0207582 A1* | 7/2014 | Flinn .................. G06Q 30/0255 705/14.66 |
| 2015/0106366 A1 | 4/2015 | Stuttle et al. |

OTHER PUBLICATIONS

International Search Report and Written Opinion issued by U.S. Patent and Trademark Office as Searching Authority in International Application No. PCT/US16/57846, dated Jan. 17, 2017 (9 pages).
European Extended Search Report issued in EP16858191.6, dated Jul. 24, 2019 (10 pages).

* cited by examiner

SYSTEM AND METHOD FOR DETECTING INTERACTION AND INFLUENCE IN NETWORKS

CROSS REFERENCE TO RELATED APPLICATIONS

This application claims priority to U.S. Provisional Application No. 62/243,955, filed Oct. 20, 2015, which is incorporated herein by references.

TECHNICAL FIELD

Embodiments of the present invention generally relate to social networks, and in particular to detecting interaction and influence in networks.

BACKGROUND

The global network of people and machines includes millions of users of the Internet and individuals with a mobile phone. Many people have a social media profile and interact with social media several times each day. This form of interconnectedness has not only opened new ways of relating with one another—and with things—but it also enables the identification of these relationships. Individuals connected via social media have a defined connection that is memorialized in data.

Beyond identifying traditional relationships, the shift toward individuals generating more and more data each day—through social media, e-commerce, remote workplaces, GPS location services, and distance learning, to name but a few—has made available a wealth of data that describes our relationships. Prior efforts to identify and quantify these relationships have been met with limited success for several reasons, one of which is the sheer volume of data available and lack of an intelligent method for processing this data.

Digital interconnectedness is only one part of the larger picture. People continue to interact face-to-face and maintain personal and professional relationships with varying degrees of closeness. Existing systems that have examined connections have largely omitted these real world relationships and instead examined only online networks such as social media.

While the amount of available computing and data processing has increased dramatically in recent years, more than raw computing power is required to intelligently identify, quantify, and traverse diverse networks of connections.

SUMMARY OF THE INVENTION

Aspects of the present disclosure relate to systems and computerized methods for providing a location-based recommendation to a user that leverages common characteristics between the user and other users in a network such that the common characteristics are derived based on monitoring and analyzing user information at different times and locations. In some embodiments, a computing device receives information associated with each of a plurality of entities in a network, the information including at least one a transaction and an activity. In some embodiments, the transaction and the activity are each associated with a location and a time. In some embodiments, the computing device receives at least one of updated location information associated with a first entity of the plurality of entities, updated transaction information associated with a first entity of the plurality of entities, and updated activity information associated with a first entity of the plurality of entities. In some embodiments, the computing device creates a data structure relating the first entity and a subset of the plurality of entities. In some embodiments, the subset is chosen based on each of the entities in the subset having information related to at least one of the updated location information, the updated transaction information and the updated activity information. In some embodiments, the data structure includes a node representing each of the entities in the subset and links connecting the nodes. In some embodiments, the computing device determines a recommendation of at least one of a transaction and an activity based on the information related to the at least one of the updated location information, the updated transaction information and the updated activity information. In some embodiments, the computing device calculates a relevance value for each of the links connecting the first entity with other entities having information associated with the recommendation, and transmits the recommendation to at least one of the first entity and a second entity in the subset when at least one relevance value exceeds a threshold, thereby providing the recommendation to an entity based on information that is common to the entity and other entities in the network and derived based on monitoring and analyzing entity information at different times and locations.

In some embodiments, the computing device receives a relevance indication from the at least one of the first entity and the second entity relating to the recommendation, and the computing device updates at least one of the relevance value and the threshold based on the relevance indication. In some embodiments, calculating the reference value includes calculating a relationship score between at least one of the first entity and the second entity and other entities in the network, the relationship score being based on a combination of a duration metric, vintage metric, interaction metric, trust and variety metric, control metric and harmony metric. In some embodiments, the computing device calculates a centrality score for each of the entities in the subset, the centrality score being based on a combination of a degree metric, a closeness metric, and a betweeness metric. In some embodiments, the computing device combines the relationship score and the centrality score to form the reference value.

In some embodiments, the duration metric is associated with a duration of a relationship between the at least one of the first entity and the second entity and other entities in the network; the vintage metric is associated with a time of a prior interaction between the at least one of the first entity and the second entity and other entities in the network; the interaction metric is associated with a number of times a connection was established in a time period between the at least one of the first entity and the second entity and other entities in the network; the trust and variety metric is associated with a number of different types of communications being used by the at least one of the first entity and the second entity and other entities in the network; the control metric is associated with a hierarchy between the at least one of the first entity and the second entity and other entities in the network; the harmony metric is associated with a synchronicity of an interaction between the at least one of the first entity and the second entity and other entities in the network; the degree metric is associated with a number of links associated with each node corresponding to between the at least one of the first entity and the second entity and other entities in the network; the closeness metric is associated with a path length between a node corresponding to the at least one of the first entity and the second entity and nodes corresponding to other entities in the network; and the betweeness metric is associated with a path length between each pair of nodes.

In some embodiments, the updated location information includes the first entity being co-located with another entity of the plurality of entities. In some embodiments, the updated location information includes a location being visited by the first entity for a first time.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Systems and methods are described herein for deriving and evaluating networks of relationships between and among individuals, locations, transactions and activities. Systems and methods are also described herein for integrating, analyzing, and evaluating data associated with the relationship network such that information derived from some individuals can be used to predict relevant connections to people, locations, transactions and activities for other individuals.

Systems and methods are also disclosed for identifying relationships and the strengths of those relationships to form a social graph of individuals and things wherein nodes on the graph represent entities such as people, organizations, and things, and the links represent the strengths of the relationships among these entities. By generating the social graph, innumerable characteristics such as an individual or entity's sphere of influence, paths between companies and prospective customers, an individual's role and their importance in the network and within specific communities, individual taste preferences, relatedness between objects and locations, and closeness between persons of significance, among many others can be identified.

As described in more detail below, an exemplary social graph can contain specific relationships as well as the strength of each relationship represented as a weight. Analysis of the social graph can factor in these weights in identifying relationships between people, locations, transactions and activities.

To form the social graph, data can be considered that is evidence of some level of relationship between two entities. For example, relationships between entities can be derived from a combination of frequency of co-location and similarities in profiles, how often an individual visit a particular restaurant, how long does he spend there, with whom does he go, where does he go before or after, how far does he travel to get there, and others. These relationships can be scored and compared to other relationships to identify patterns that can predict future behavior and be used to identify entities, locations, transactions and activities that are relevant to another entity.

While individuals are an important key element of the social graph, the system and method of the present invention may be extended to any relationship for which data can be gathered. Examples include associations, brands, locations, political parties, tastes, styles, objects, devices, things, food, drink, objects, and so forth. Throughout this disclosure, the terms "individual" and "entity" are used interchangeably and indicate any of the broad spectrum of persons and things for which relationships may be identified.

Further the term "social graph" is not intended to be limited to a network of individuals, but is intended to encompass the full extent of persons and things for which relationships may be identified.

Figure 2:
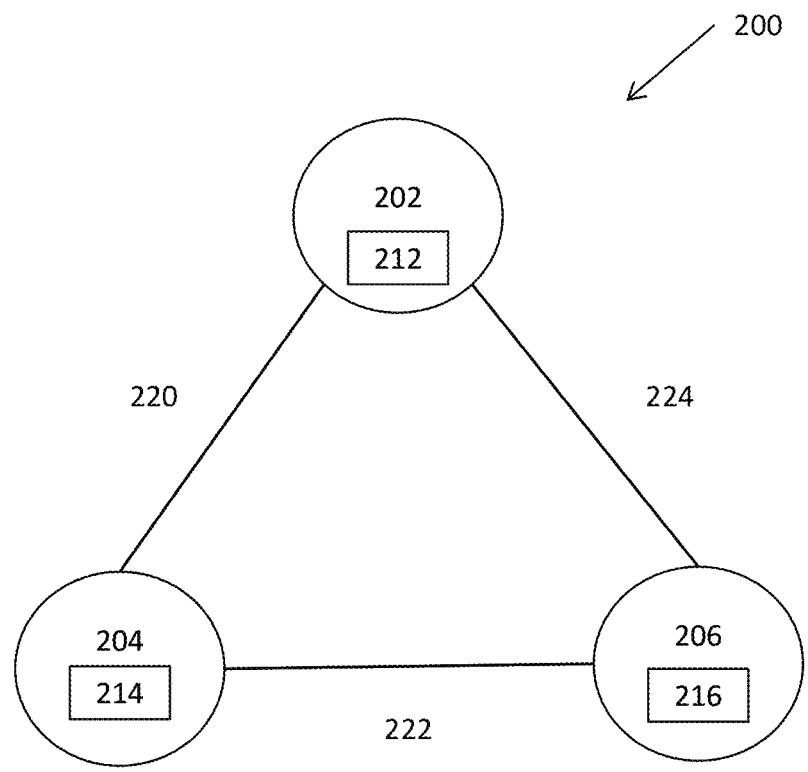
FIG. 2 is a diagram showing a social graph, according to some embodiments of the present disclosure.

As shown in FIG. 2, and described in more detail in the text accompanying FIG. 2, an exemplary social graph can contain representation of the type and quality of relationships among individuals and entities. For example, a person's connection to other people, transactions, activities or certain places they visit regularly, all can be represented in the social graph. Similarly, a person may have a preference for a particular type of food, a certain type of vacation destination, or a certain style of clothing. A person can sit on a board of directors, be affiliated with a charitable organization or work in a co-working space. These may all be represented in the social graph as relationships, along with a metric representing the strength of those relationships.

In addition to identifying relationships and their relative strength, as discussed below, some embodiments described in the present disclosure can identify changes in the network and evaluate the importance of those changes. In some embodiments, guesses as to future behavior can be made based upon the past with the goal of providing a recommendation.

Data collection for the system described herein can come through myriad sources both public and private, as well as data provided directly by a user. In some embodiments, data sources can include apps, APIs, public and government data repositories, census data, location data, and data from connected devices, among others. There is practically no limitation on the type of data that may be analyzed by the system, provided that it can be accessed.

Figure 1:
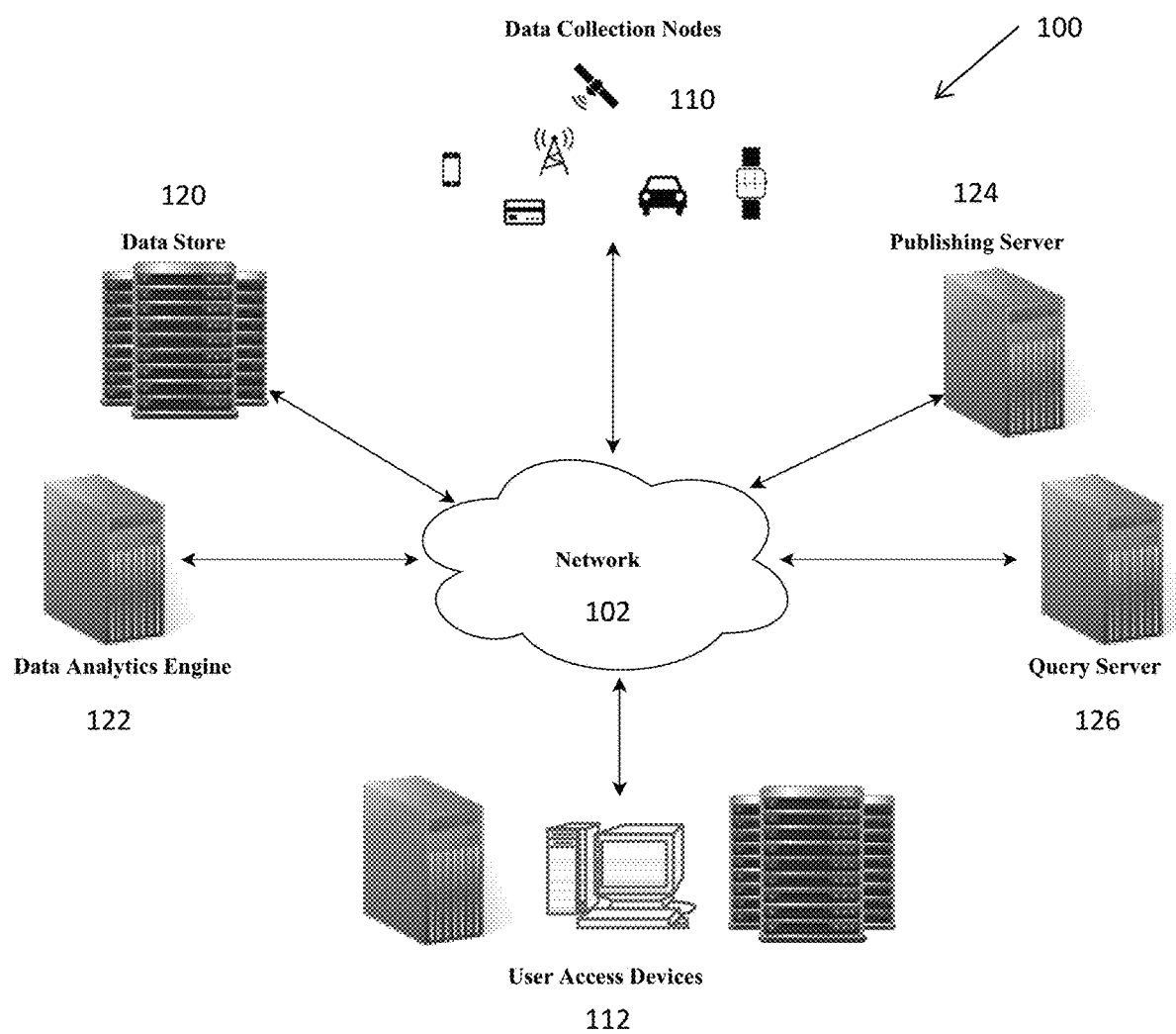
FIG. 1 is a system diagram showing a networked system, according to some embodiments of the present disclosure.

FIG. 1 is a system diagram showing a networked system 100, according to some embodiments of the present invention. FIG. 1 shows a network 102, data collection nodes 110, user access devices 112, data store 120, data analytics engine 122, publishing server 124, and query server 126.

Network 102 enables point-to-point communication between components in the system. Network 102 can be public network such as the Internet, with each component connected via a gateway using communication protocols such as Wi-Fi, Ethernet and 4G wireless. Alternatively, network 102 can be a closed network such as a local area network (LAN) with the various components of the relationship analytics system not accessible on the open Internet. In some embodiments, communications via network 102 can be encrypted, or additional security protocols me be utilized such as virtual private network (VPN) or secure socket shell (SSH) tunneling.

Data collection nodes 110 collect information from users participating in the networked system. In some embodiments, the data collection nodes 110 can include any computerized device capable of recording and transmitting information about a user's proximity to another user, location, transactions, and/or activities. In some embodiments, the computerized device can include a smart phone, tablet, computer, laptop, or smart watch that may be installed with a mobile application that facilitates the gathering of data.

In some embodiments, data collection node 110 can include vehicle-mounted data collection agents such auto onboard diagnostics modules, telemetrics and telematics modules, transponders, onboard GPS modules, and other systems that collect relevant data.

In some embodiments, data collection node 110 can include data stores housing preexisting data gathered that is relevant to, or evidences, entity relationships. In some embodiments, data can include purchasing data such as credit or debit card use. In further embodiments, data can include information gathered from social networks such as Facebook, LinkedIn, Twitter, Pinterest, gathered either through data provided directly by the social media network, through an application programming interface, or by browsing the network. In some embodiments, social network detection can detect all connections between the user and persons detected in email, calendar, telephone calls, location data, third party company register databases (e.g., CRIF, CreditSafe, Experian, etc.), and/or interfaces (LinkedIn API, XING API, etc.).

In some embodiments, data collection node 110 can be a web crawler or bot that systematically browses the Internet for relevant data.

In some embodiments, data collection node 110 can include consumer wearable devices or fitness monitors such as the Jawbone Up, Fitbit Charge, or Apple Watch devices.

In some embodiments, data can be transmitted directly from data collection node 110 to network 102 (e.g., in the case of the mobile application) or can be collected through an intermediate step. For example, in the case of a vehicle telemetrics system, an intermediate module may be utilized to gather information from the onboard device and transmit it over a wireless link to a smartphone where it may then be transmitted to network 102.

In some embodiments, data collection can be by specific permission of the user (such as with data from LinkedIn or a credit card), or can be enabled through a terms of service agreement with the data provider. Alternatively, data can be collected by permission of the service provider or data aggregator. In some embodiments, data can be collected via a mobile application or other software that is configured to operate with the networked system and which is tailored to provide select data to the system consistent with its intended purpose.

In some embodiments, a mobile application can be installed on a user's smartphone computing device and provide the user with the ability to opt-in to various data collection mechanisms. For example, a user can permit the system described herein, via the mobile app, to gather the user's contacts, Facebook friends, Instagram friends, position data over time, and payments made using the smartphone computing device, telephone and messaging patterns.

In some embodiments, a data collection node 110 can take the form of an application or applets that is provided with various connected devices. For example, an app embedded in a DVR could transmit data concerning viewing habits and preferences, while software embedded in a car's navigation system could transmit data concerning position and driving patters.

It will be appreciated by those of skill in the art that there is no limit to the type and variety of data collection nodes that can be utilized with systems described in the present disclosure.

Data store 120 stores data received from data collection nodes 110 and from the data analytics engine 122, which is described in more detail below. In some embodiments, the data received from data collection nodes 110 is received prior to processing. As described in more detail below, the data in the data store 120 can be updated with relationship analytics data generated during processing.

In some embodiments, data store 120 includes cloud-based storage system with capacity to store the anticipated data load from the system. Exemplary data stores include Amazon S3, Windows Azure Storage, Google Cloud Storage, SpiderOak, and the like. Alternatively, data store 120 can be hosted locally and connected via a network connection to the remainder of the system.

Data analytics engine 122 receives and processes data from data store 120 and data collection nodes 110. As described in more detail below, data analytics engine 122 can update the relationship data store in the data store with relationship analytics data generated when new user data is received.

In some embodiments, data analytics engine 122 can take evidence of interaction and influence between individuals, organizations, and even devices, and derive a social graph, as described in more detail in the text accompanying FIG. 2. Briefly, nodes on the graph can represent entities (e.g., people, organizations, and devices) and the vertices or links can represent the strength of relationships between entities. Once a social graph has been generated, data analytics engine 122 can then provide scoring on areas such as relationship strength, overall connectedness, and entity centrality.

In some embodiments, a data analytics engine 122 can include a server computer implementing a database for holding the data gathered by data collection nodes 110. In a preferred embodiment, database is a graph database in which semantic queries can be made and which is particularly suited to modeling data elements based upon the relationship between those elements. One example of a graph database is the Neo4j graph database, though other graphing database systems may be substituted for Neo4j such as the Teradata Aster, Stardog, FlockDB, InfiniteGraph, GraphDB, and AllegroGraph systems, among others. In alternate embodiments, a data analytics engine can implement a relational database such as Apache SQL or equivalent.

In some embodiments, a particular configuration of data analytics engine 122 can depend on a number of factors such as the type of database, the anticipated size of the database, and user performance expectations. For example, when utilizing Neo4j, data analytics engine 122 can be run on a server having an Intel Core i7 processor, and having at least 2 GB of memory, 10 GB or more of disk space, and utilizing an ext4 file system. Other implementations may have different requirements. In embodiments, the system is scalable and additional processing capacity can be added as demand increases.

User access devices 112 can access data analytics engine 122 to run data queries access pre-run queries and reports. User access devices 112 can access data analytic engine 122 directly or through a query server 126. A query server 126 can access data analytics engine 122 to enable dynamic inquiries against the data topology. Query server 126 can respond to real-time inquiries or pre-store common inquiries for rapid retrieval. In some embodiments, a user access device 112 can be implemented as a web-based portal that is run on a remote server (e.g., data analytics servicer or a dedicated web server), and accessed through a conventional web browser run on a personal computing device such as a laptop, tablet, or smartphone. Alternatively, a user access device 112 can take the form of any computing device running software that is customized to work with the systems described herein. For example, and as described in more detail below, a user can query the system for a restaurant suggestion when visiting a new city or query the system for suggestions for a brand to purchase at a shopping center.

A publishing server 124 can receive processed data from the data analytic engine 122 or the query server 126 and transmit the information to a data collection node 110 or a user access device. As described in more detail below, the processed data can include pre-rendered traversals or extractions from the topology to allow rapid access to an individual or company network. In embodiments, publishing server data can be stored in custom formats specific to individual consumers and can be rendered to the user in any conventional format such as via a web server. In some embodiments, information calculated using the data analytic engine 122 (e.g., a restaurant recommendation) can be sent to a user device using the publishing server 124.

FIG. 2 is a diagram showing a social graph 200, according to some embodiments of the present disclosure. The social graph 200 includes nodes 202 204 206, node parameters 212 214 216, and links 220 222 224.

As described above, a social graph 200 is one way to represent entities and relationship between entities. Other methods of visualizing entities and relationship to entities (e.g., matrix) are equally applicable to the systems and methods described herein.

Nodes 202 204 206 represent entities and are each associated with a set of parameters 212 214 216. As described above, the parameters 212 214 216 can be assigned to the nodes 202 204 206, respectively, based on information received from data collection nodes 110. The entities can include people, organizations, and devices. The parameters 212 214 216 can include information identifying the entity and describing at least one of a relationship to a location, activity, or transaction associated with the entity. For example, if the entity is as person, the parameters can include an identification number, birthday, gender, employer, credit rating, location (and location accuracy), salary, recent transactions, and recent activities. As another example, if the entity is a company, the node can include properties such as company ID, vendor ID, company name, year of founding, address, industry, industry ranking, credit rating, location information, represented as the latitude and longitude of the company, and an indicator of the confidence in the accuracy of the location coordinates. Company location information can be useful for determining the movement and interaction of individuals. In some embodiments, parameter information can be associated with a time that the parameter information is observed, received or processed.

As used herein, transactions can refer to purchases (e.g., clothes, food, travel, merchandise) and activities can refer to events (e.g., sporting events, classes, parties).

A node (e.g., node 202) can be connected to other nodes (e.g., node 204 and node 206) via links 220 222 224. The links can represent the strength of relationships between entities or the strengths between parameters associated with the entities. The strength of a relationship between entities can vary depending on the nature of the entities involved and the evidence at hand. In some embodiments and as described in more detail below, smaller scores are considered better and are analogous to distance. A relationship strength value can be referred to as the distance between nodes and measured in units referred to herein as axons.

In embodiments, sub-graphs representing the effective reach of an entity are provided. These sub-graphs—known as ego networks—are distance-limited sub-graphs for an entity. In embodiments, once the social graph has been created, ego networks are the basic unit for all further processing. An ego network can be generated using the following guidelines:

A maximum traversal distance can be set that restricts the sub-graph to paths that are less than the maximum traversal distance measured in axons. In some embodiments, the maximum traversal distance may be set to 100,000 axons, but others settings can be utilized depending on the application.

Hop penalties can be applied to the distance for each hop in the path by multiplying the distance by the penalty. For example, if a first hop between nodes has a penalty of 5 and the first hop's distance was 100 axons, it would effectively have a scaled distance of 500 axons.

A traversal timeout can be incorporated to restrict large networks that can cause a processing delay. The traversal timeout is a palliative measure that should not be necessary in a well-balanced graph. In some embodiments, a traversal timeout may be set to 15 seconds, but variations may be utilized depending on the system.

Depending on whether the root of the ego network is an individual or an entity, additional restrictions on ego network generation can be enforced such as limitations on the network characteristics that are considered during traversal.

In some embodiments, different social graphs can be created based on a desired commonality factor between entities. The relevant ego networks can be distinctive from each other in this case. For example, in determining an entity's effects on node 202, link 220 to node 204 may be stronger if the inquiry relates to the entity that will have the most correlation to node 202 in terms of relevant restaurant suggestions in City A, while link 224 to node 206 may be stronger if the inquiry relates to the entity that will have the most correlation to node 202 in terms of relevant retailer for casual clothing.

A commonality factor can be determined for an entity based on a changed parameter for the entity. For example, when an entity travels to a new location, a social graph can be created based on factors that are relevant to traveling to a new place (e.g., hotel, rental car, restaurants). As another example, the changed parameter can include a particular purchase or a noticed pattern of purchases. Based on this changed parameter, other merchants can be recommended to an entity. In some embodiments, changed parameters can determine an entity's familiarity with an area. The social graph can look very different in an entity's home town than in a place the entity has never visited before. For example, a hotel can have a different relevance value in an entity's home town than it does in a new place that the entity is visiting (a place with less familiarity). In some embodiments, changed parameter information includes both a location and time associated with the changed parameter.

In some embodiments, information from the social graph is used to provide a recommendation to a user. As described in more detail below, the recommendation is based on relevance score that is based on both a relationship strength and a centrality of the entities associated with the relationships. The recommendation can be based on a changed parameter associated with the user, or a changed parameter associated with other users in the network. For example, a changed parameter can be a user moving to a new location, which can prompt, for example, a recommendation of a new restaurant. A changed parameter can also be purchases made by other users in the network, which prompt a purchase to be recommended to a particular user. For example, other users who have a number of similar purchases as a particular user may have made an additional purchase that would be relevant to the particular user. Alternatively, other users may have made additional purchases that line up with the purchases made by a particular user, increasing the relevance of a previous purchase of the other users to the particular user.

In some embodiments, a scoring relationship strength can vary depending on the nature of the entities involved and the information available. For example, a relationship between two individuals may be assessed using metrics such as the length of that relationship, whether the relationship is personal or professional, how often two individuals are in the same location, and how often the individuals visit similar locations, among others. Similarly, the relationship between an individual and a particular brand may include how long the individual has been purchasing that brand, how often the individual purchases competing brands, and how often one product is purchased at the same time as another product, among others. While there may be overlap among relationship characteristics depending on the type, there may also be differences.

In measuring the strength of a relationship a score can be assessed in axons, which was mentioned briefly above. Smaller scores are considered better, and are analogous to distance. In addition to scoring relationships, the centrality of an entity can also be scored to quantify the entity's connectedness within the network, which in turn measures the influence of that entity.

Individual relationships may be represented using weighted interconnections that score the relationships based upon the characteristics of the relationships. In embodiments, characteristics include duration, vintage, interaction, trust/variety, control, and harmony.

Figure 3:
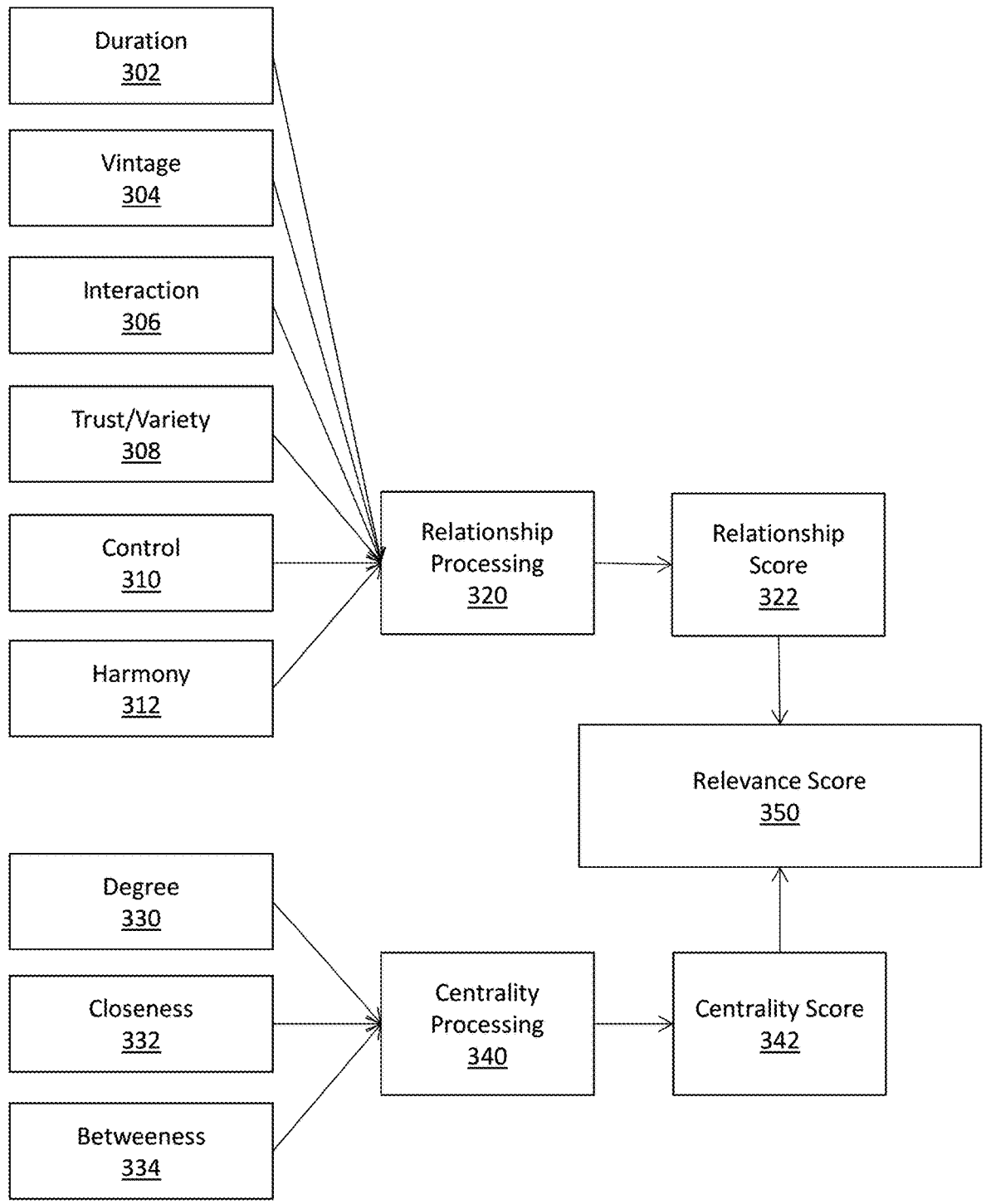
FIG. 3 is a flowchart showing the calculation of a relevance score for one entity based on other entities, according to some embodiments of the present disclosure.

FIG. 3 is a flowchart showing the calculation of a relevance score for one entity based on other entities, according to some embodiments of the present disclosure. FIG. 3 shows calculating a relevance score 350 based on a relationship score 322 and a centrality score 342. The relationship score 322 is calculated using relationship processing 320 of duration 302, vintage 304, interaction 306, trust 308, control 310, and harmony 312. The centrality score 342 is calculated using centrality processing 340 of degree 330, closeness 332, and betweeness 334.

A duration metric 302 of a relationship refers to how long a relationship has existed between two entities. In a simple embodiment, duration can represent the time between the first interaction and the last. In more complex embodiments, duration could represent an aggregate of the interactions between entities.

Vintage metric 304 of a relationship can be determined based on the last date and time of an interaction. A higher vintage rating will be assumed where the last date and time of an interaction is close to the current date and time. In embodiments, vintage captures how recent and active the interactions are and may examine, for example, how recently two people worked together or came into contact with each other, or whether this is an active relationship or one that occurred in years past. An active relationship can be assigned a higher score than one that occurred 20 years in the past. In some embodiments, vintage can incorporate a decay factor that penalizes the relationship score for a relationship of older vintage.

Interaction metric 306 indicates a closeness of entities. In some embodiments, interaction 306 can consider the number of times a connection was established in a certain time period, such as in the last year. For a business relationship it might be expected that two executives in a small firm would have a high degree of interaction, and a board member and a junior executive in a large firm would have less. With individuals, two people in the same town may be indicative of a weak interaction whereas two people in the same building is a strong interaction. Other variables can be incorporated such as the nature of the location. For example, two people co-located in a remote holiday home is probably a stronger indicator than two people co-located in an office block.

Trust/Variety metric 308 can be determined based on the number of different types of communications used, such as email, telephone calls, personal meetings according to calendar events or location data, for example. A high trust rating can be assigned where a large number of different communication types are detected. In some embodiments, a relationship occurring in multiple scenarios is indicative of a strong relationship, particularly if those interactions are highly unlikely to occur randomly.

Control metric 310 can apply to particular types of relationships such as hierarchical relationships, and measures how much direct influence one entity has over another. For example, the sole owner of small business can have more direct influence on a business as compared to a partial stakeholder of a large corporation has influence on the corporation. In a social setting, one individual's preferences can have more influence than another's on deciding where they should go next together, which impacts the relevance of certain recommendations. For example, a person who is connected to another person via pre-established social networks or who is co-located together frequently with the other person in places that are not often associated with a high correlation of being co-located can have more influence on that other person than someone who is not connected via social media or by location.

Harmony metric 312 refers to the amount of harmony or synchronicity of an interaction between two entities. For example, if two people arrive and leave a location at the same time, it may indicate that the two were travelling together and that their relationship should be scored more highly. If they happen to overlap but start and end at different times, this may be a weak indicator of a relationship.

Relationship processing 320 includes weighting and combining duration 302, vintage 304, interaction 306, trust/variety 308, control 310, and harmony 312 to produce a relationship score 322. As an example, strength of an interpersonal relationship can be scored based on how long the individuals know each other (the time between their first co-location and today), the last time they saw each other (vintage of last co-location), number of co-locations (interaction), the number of different contexts (trust/variety) the two individuals are co-located in (if the locations are all work related, the score will be lower than if it's multiple categories (movies, dinners, parks)). The weights assigned each of duration 302, vintage 304, interaction 306, trust/variety 308, control 310, and harmony 312 can vary depending on the context (e.g., the nature of the parameter that changed). For example, control 310 and harmony 312 can be weighted more heavily than other factors to determine what the best lunch recommendation would be for two people looking for a place to eat. In some embodiments, the relevance of the recommendation depends on understanding who the decision maker is and how they are aligned.

In some embodiments, a normalization factor may be incorporated into a relationship score 322 to reflect the incompleteness of data. Normalization can consider the proportion of data or elapsed time for a given input device so that a relationship is not scored only on absolute values. Normalization can be a factor where one individual in the social graph only recently began utilizing a particular technology (e.g., a smartphone, social media, mobile app) considered by the system.

A centrality score 342 refers to the centrality of an individual or company to determine whether the entity is an important or central player in a community and may thus be viewed as influential. Centrality can be quantified using a variety of metrics including degree 330, closeness 332, and betweenness 334.

Degree centrality metric 330 refers to a count of how many links a node has and assumes that more links mean more influence on the network, and it has been found that degree centrality is particularly useful for measuring the influence of an entity. In some embodiments, a variation of degree centrality known as Eigenvector Centrality can also be used. Eigenvector Centrality factors in the centrality of the neighboring nodes. This calculation is an iterative process that considers the degree centrality for all nodes, and then examines the scores for neighboring nodes. If a neighboring node also has a high degree centrality then score of the current node will be adjusted.

Closeness centrality metric 332 refers to a path length between one node and other nodes. Closeness centrality 332 can consider each node with respect to the entire network by, for each node, calculating the shortest path distance to all other nodes and taking an average. Nodes that are central to (or deeply embedded in) the network would have a low average distance. Nodes that are peripheral would have a high average shortest path distance.

Betweenness centrality metric 334 refers to a measure of path length between every pair of nodes. Beteeness centrality 334 can identify "boundary-spanners" or nodes that form key intersections in the graph. In some embodiments, calculation of betweenness centrality involves calculating the shortest path between every pair of nodes in the networks. Since shortest paths will tend to travel through boundary spanning nodes, boundary spanners can be identified by counting how often they fall on a shortest path.

In some embodiments, enhanced centrality metrics can be utilized to better determine the centrality of an entity. In some embodiments, these enhanced centrality metrics incorporate reach beyond the first hop to an adjacent node, and also incorporate weighted paths so they are able to measure not only how many entities are within reach, but how many and how close they are.

Calculation of an entity's centrality can include penalization to the score the as the distance from the start of a route increases, a factoring known as a hop penalty. Hop penalties do not impact degree centrality as degree centrality only considers the start node and its immediate neighbors.

Centrality processing 320 includes weighting and combining duration degree 330, closeness 332, and betweeness 334 to produce a centrality score 342. Measuring the centrality in a set of venues or entities relevant for an individual facilitates making a recommendation to another individual. For example, a first user with five restaurants visited in common with a particular user over a two week period of time can have a higher centrality score than a second user with three restaurants visited in common with the same particular user. Alternatively, a first user with five restaurants visited in common with a particular user over a two week period of time can have a higher centrality score than a second user with five restaurants visited in common with the same particular user over a ten week period of time.

Relationship score 322 and centrality score 342 are weighted and combined to form relevance score 350. The relevance score provides an understanding of when something is relevant for a user. This is constantly calculated before a recommendation is made to a user. A user can be allowed to give feedback on the relevance of the recommendation. This feedback can then be used to tweak the sensitivities of the scores.

Figure 4:
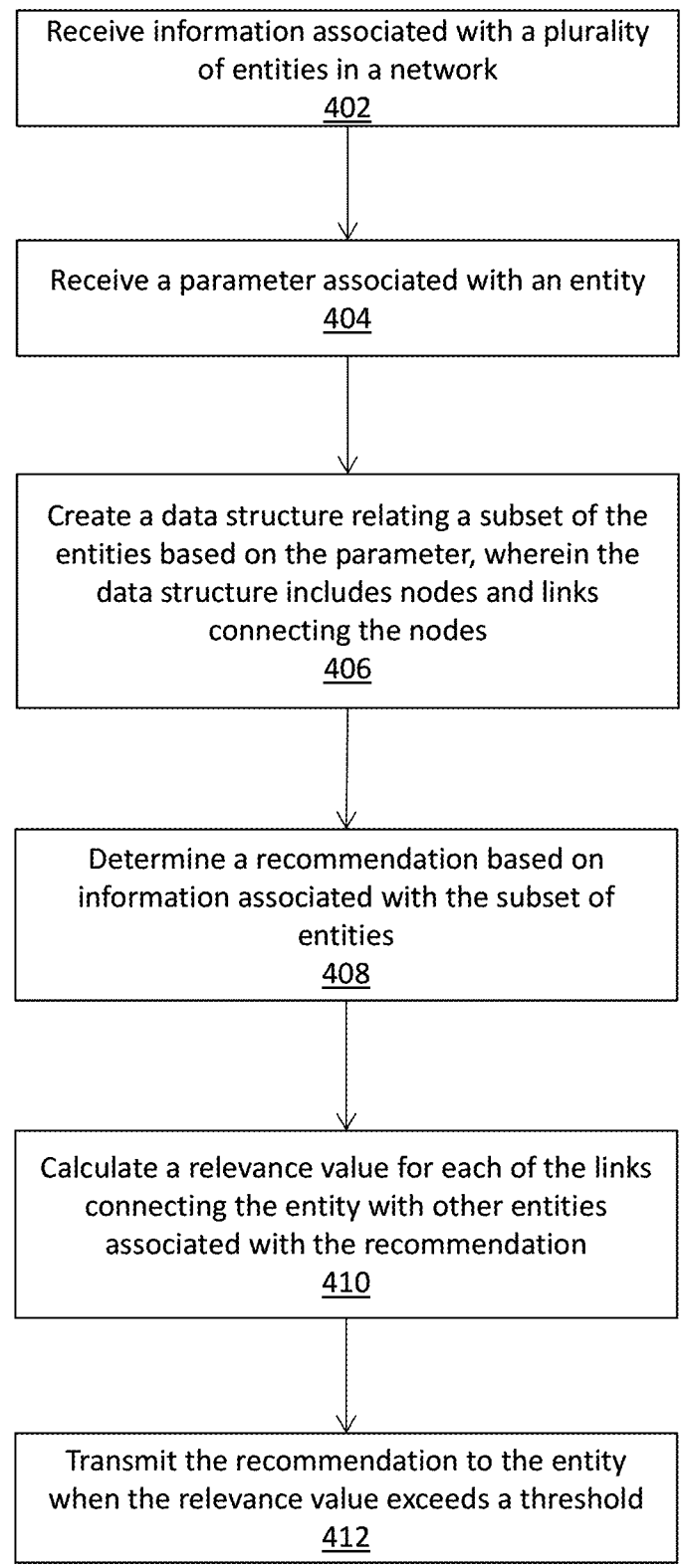
FIG. 4 is a flowchart showing a method of sending a recommendation to a user, according to some embodiments of the present disclosure.

FIG. 4 is a flowchart showing a method of sending a recommendation to a user, according to some embodiments of the present disclosure.

Referring to step 402, information associated with a plurality of entities in a network is received. For example, this information can include an identity of an entity, a relationship of an entity with another entity, a location associated with an entity, a transaction associated with an entity, or an activity associated with an entity. In some embodiments, this information is compiled from information received over time or imported from other databases (e.g., Facebook, LinkedIn). The information can include raw data or be presorted or correlated. In some embodiments, the information is associated with a location and time.

Referring to step 404, a parameter associated with an entity is received. The parameter can be a particular piece of information associated with the entity. For example, the information can be one or more of a relationship of the entity with another entity, a location associated with the entity, a transaction associated with the entity, or an activity associated with the entity. In some embodiments, the parameter is an update to information that was previously received for the entity or other entities linked to the entity. For example, the parameter can include a current location associated with the entity or an additional number of transactions made or activities participated in by other entities.

Referring to step 406, a data structure relating to a subset of entities is created based on the parameter, wherein the data structure includes nodes and links connecting the nodes. The subset can be selected based on an entity's relevance to the parameter. For example, if the parameter is a current location associated with a new travel excursion for an entity, other entities that do not have a history of travel and food expenditures near the current location or in locations similar to the current location may not be included in the subset. As another example, the subset may be selected based on other commonalities between the entity and other entities. For example, an entity that subscribes to the same food magazines and watches the same cooking shows can be considered relevant to the another entity with the same habits, even if the entities' respective locations (or history of locations) do not align.

The data structure illustrating the relationship between the entity and other entities can take the form of a graph with nodes and links. As described above, the nodes can represent the entities, and the links can represent a relationship between the entities. Also as described above, the links can include values describing the strength of the links. Strength, as referred to herein, can refer to an amount of influence one node's information has on a second node. For example, if one entity visits a new city, a restaurant may be suggested from another entity's list the two entities have a pattern of eating at the same restaurants in another city.

Referring to step 408, a recommendation is determined based on information associated with the subset of entities. In some embodiments, the recommendation is a suggested next transaction, connection to an individual, or activity for the entity. For example, if an entity starts a new job in a new location, a recommendation can be a co-worker that has links to other entities within the entity's network. As another example, when an entity moves to a particular location around a meal time, a recommendation can be a restaurant new to the entity that has been visited by other entities in the network that share a certain number (e.g., 5-10) other restaurants in common with the entity. In some embodiments, another condition other than a number of restaurants in common is a time period during which the entities visited the restaurant (e.g., within 1-3 months).

Referring to step 410, a relevance value is calculated for each of the links connecting the entity with other entities associated with the recommendation. As described above, the relevance value is calculated based on a combination of a relationship score and a centrality score.

Referring to step 412, a recommendation is transmitted to the entity when the relevance value exceeds a threshold. A relevance value exceeding a threshold indicates that an entity may find the recommendation useful. In some embodiments, the algorithm associated with calculating the relevance value can be adjusted based on user responses. For example, when a recommendation is sent to a user, the user can respond that the recommendation is not relevant to the user (e.g., a user disliking a restaurant recommendation). When the response is received, weights or thresholds associated with the algorithm can be adjusted (e.g., weighting a type of cuisine with greater or lower importance, including more or less restaurants in common to satisfy a threshold number). In some embodiments, the recommendation is transmitted for display on a device associated with the entity.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method for providing a location-based recommendation to a user that leverages common characteristics between the user and other users in a network such that the common characteristics are derived based on monitoring and analyzing user information at different times and locations, the computerized method comprising:
   receiving, by a computing device, information associated with each of a plurality of entities in a network, the information including at least one of a transaction or an activity, the at least one of the transaction or the activity each being associated with a location and a time;
   receiving, by the computing device, at least one of:
      updated location information associated with a first entity of the plurality of entities,
      updated transaction information associated with the first entity, or
      updated activity information associated with the first entity;
   determining, by the computing device, based on the at least one of the updated location information, the updated transaction information, or the updated activity information, that the first entity is on a travel excursion;
   creating, by the computing device, a data structure relating the first entity and a subset of the plurality of entities, the subset being chosen based on the each of the entities in the subset having information related to the travel excursion, the data structure including a node representing each of the entities in the subset and links connecting the nodes;
   determining, by the computing device, a recommendation of at least one of a transaction and an activity based on the information related to the at least one of the updated location information, the updated transaction information, or the updated activity information;
   determining, by the computing device, based on the at least one of the updated location information, the updated transaction information, or the updated activity information, that the travel excursion is to a new location;
   calculating, by the computing device, a relevance value for each of the links connecting the first entity with other entities having information associated with the recommendation, the relevance value being based on the determination that the travel excursion is to the new location; and
   transmitting, by the computing device, the recommendation to at least one of the first entity or a second entity in the subset when at least one relevance value exceeds a threshold,
   thereby providing the recommendation to an entity based on information that is common to the entity and other entities in the network and derived based on monitoring and analyzing entity information at different times and locations.

2. The computerized method of claim 1, further comprising:
   receiving, by the computing device, a relevance indication from the at least one of the first entity or the second entity relating to the recommendation; and
   updating, by the computing device, at least one of the relevance value or the threshold based on the relevance indication.

3. The computerized method of claim 1, wherein calculating the relevance value comprises:
   calculating, by the computing device, a relationship score between at least one of the first entity or the second entity and other entities in the network, the relationship score being based on a combination of a duration metric, a vintage metric, an interaction metric, a trust and variety metric, a control metric, and a harmony metric;
   calculating, by the computing device, a centrality score for each of the entities in the subset, the centrality score being based on a combination of a degree metric, a closeness metric, and a betweenness metric; and
   combining, by the computing device, the relationship score and the centrality score to form the relevance value.

4. The computerized method of claim 3, wherein:
   the duration metric is associated with a duration of a relationship between the at least one of the first entity or the second entity and other entities in the network;
   the vintage metric is associated with a time of a prior interaction between the at least one of the first entity or the second entity and other entities in the network;
   the interaction metric is associated with a number of times a connection was established in a time period between the at least one of the first entity or the second entity and other entities in the network;
   the trust and variety metric is associated with a number of different types of communications being used by the at least one of the first entity or the second entity and other entities in the network;
   the control metric is associated with a hierarchy between the at least one of the first entity or the second entity and other entities in the network;
   the harmony metric is associated with a synchronicity of an interaction between the at least one of the first entity or the second entity and other entities in the network;
   the degree metric is associated with a number of links associated with each node corresponding to the at least one of the first entity or the second entity and other entities in the network;
   the closeness metric is associated with a path length between a node corresponding to the at least one of the first entity or the second entity and nodes corresponding to other entities in the network; and
   the betweenness metric is associated with a path length between each pair of nodes.

5. The computerized method of claim 1, wherein the updated location information comprises the first entity being co-located with another entity of the plurality of entities.

6. The computerized method of claim 1, wherein the updated location information comprises a location being visited by the first entity for a first time.

7. A non-transitory computer readable medium having executable instructions operable to cause an apparatus to:
   receive information associated with each of a plurality of entities in a network, the information including at least one of a transaction or an activity, the at least one of the transaction or the activity each being associated with a location and a time;
receive at least one of:
    updated location information associated with a first entity of the plurality of entities,
    updated transaction information associated with the first entity, or
    updated activity information associated with the first entity;
determine, based on the at least one of the updated location information, the updated transaction information, or the updated activity information, that the first entity is on a travel excursion;
create a data structure relating the first entity and a subset of the plurality of entities, the subset being chosen based on the each of the entities in the subset having information related to the travel excursion, the data structure including a node representing each of the entities in the subset and links connecting the nodes;
determine a recommendation of at least one of a transaction or an activity based on the information related to the at least one of the updated location information, the updated transaction information, or the updated activity information;
determine, based on the at least one of the updated location information, the updated transaction information, or the updated activity information, that the travel excursion is to a new location;
calculate a relevance value for each of the links connecting the first entity with other entities having information associated with the recommendation, the relevance value being based on the determination that the travel excursion is to the new location; and
transmit the recommendation to at least one of the first entity or a second entity in the subset when at least one relevance value exceeds a threshold,
thereby providing the recommendation to an entity based on information that is common to the entity and other entities in the network and derived based on monitoring and analyzing entity information at different times and locations.

8. The non-transitory computer readable medium of claim 7, wherein the apparatus is further caused to:
receive a relevance indication from the at least one of the first entity or the second entity relating to the recommendation; and
update at least one of the relevance value or the threshold based on the relevance indication.

9. The non-transitory computer readable medium of claim 7, wherein to calculate the relevance value, the apparatus is further caused to:
calculate a relationship score between at least one of the first entity or the second entity and other entities in the network, the relationship score being based on a combination of a duration metric, a vintage metric, an interaction metric, a trust and variety metric, a control metric, and a harmony metric;
calculate a centrality score for each of the entities in the subset, the centrality score being based on a combination of a degree metric, a closeness metric, and a betweenness metric; and
combine the relationship score and the centrality score to form the relevance value.

10. The non-transitory computer readable medium of claim 9, wherein:
the duration metric is associated with a duration of a relationship between the at least one of the first entity or the second entity and other entities in the network;
the vintage metric is associated with a time of a prior interaction between the at least one of the first entity or the second entity and other entities in the network;
the interaction metric is associated with a number of times a connection was established in a time period between the at least one of the first entity or the second entity and other entities in the network;
the trust and variety metric is associated with a number of different types of communications being used by the at least one of the first entity or the second entity and other entities in the network;
the control metric is associated with a hierarchy between the at least one of the first entity or the second entity and other entities in the network;
the harmony metric is associated with a synchronicity of an interaction between the at least one of the first entity or the second entity and other entities in the network;
the degree metric is associated with a number of links associated with each node corresponding to the at least one of the first entity or the second entity and other entities in the network;
the closeness metric is associated with a path length between a node corresponding to the at least one of the first entity or the second entity and nodes corresponding to other entities in the network; and
the betweenness metric is associated with a path length between each pair of nodes.

11. The non-transitory computer readable medium of claim 7, wherein the updated location information comprises the first entity being co-located with another entity of the plurality of entities.

12. The non-transitory computer readable medium of claim 7, wherein the updated location information comprises a location being visited by the first entity for a first time.

13. A computing device for providing a location-based recommendation to a user that leverages common characteristics between the user and other users in a network such that the common characteristics are derived based on monitoring and analyzing user information at different times and locations, the computing device comprising:
data storage; and
a processor in communication with the data storage, and configured to run a module stored in memory that is configured to cause the processor to:
    receive information associated with each of a plurality of entities in a network, the information including at least one of a transaction or an activity, the at least one of the transaction or the activity each being associated with a location and a time;
    receive at least one of:
        updated location information associated with a first entity of the plurality of entities,
        updated transaction information associated with the first entity, or
        updated activity information associated with the first entity;
    determine, based on the at least one of the updated location information, the updated transaction information, or the updated activity information, that the first entity is on a travel excursion;
    create a data structure relating the first entity and a subset of the plurality of entities, the subset being chosen based on the each of the entities in the subset having information related to the travel excursion, the data structure including a node representing each of the entities in the subset and links connecting the nodes;

determine a recommendation of at least one of a transaction or an activity based on the information related to the at least one of the updated location information, the updated transaction information or the updated activity information;

determine, based on the at least one of the updated location information, the updated transaction information, or the updated activity information, that the travel excursion is to a new location;

calculate a relevance value for each of the links connecting the first entity with other entities having information associated with the recommendation, the relevance value being based on the determination that the travel excursion is to the new location; and transmit the recommendation to at least one of the first entity or a second entity in the subset when at least one relevance value exceeds a threshold, thereby providing the recommendation to an entity based on information that is common to the entity and other entities in the network and derived based on monitoring and analyzing entity information at different times and locations.

14. The computing device of claim 13, wherein the processor is further caused to:

receive a relevance indication from the at least one of the first entity or the second entity relating to the recommendation; and update at least one of the relevance value or the threshold based on the relevance indication.

15. The computing device of claim 13, wherein to calculate the relevance value, the processor is further caused to:

calculate a relationship score between at least one of the first entity or the second entity and other entities in the network, the relationship score being based on a combination of a duration metric, a vintage metric, an interaction metric, a trust and variety metric, a control metric, and a harmony metric;

calculate a centrality score for each of the entities in the subset, the centrality score being based on a combination of a degree metric, a closeness metric, and a betweenness metric; and combine the relationship score and the centrality score to form the relevance value.

16. The computing device of claim 15, wherein:

the duration metric is associated with a duration of a relationship between the at least one of the first entity or the second entity and other entities in the network;

the vintage metric is associated with a time of a prior interaction between the at least one of the first entity or the second entity and other entities in the network;

the interaction metric is associated with a number of times a connection was established in a time period between the at least one of the first entity or the second entity and other entities in the network;

the trust and variety metric is associated with a number of different types of communications being used by the at least one of the first entity or the second entity and other entities in the network;

the control metric is associated with a hierarchy between the at least one of the first entity or the second entity and other entities in the network;

the harmony metric is associated with a synchronicity of an interaction between the at least one of the first entity or the second entity and other entities in the network;

the degree metric is associated with a number of links associated with each node corresponding to the at least one of the first entity or the second entity and other entities in the network;

the closeness metric is associated with a path length between a node corresponding to the at least one of the first entity or the second entity and nodes corresponding to other entities in the network; and the betweenness metric is associated with a path length between each pair of nodes.

17. The computing device of claim 13, wherein the updated location information comprises the first entity being co-located with another entity of the plurality of entities.

18. The computing device of claim 13, wherein the updated location information comprises a location being visited by the first entity for a first time.

* * * * *